United States Patent
Leung Ki (10) Patent No.: US 11,932,043 B2
(45) Date of Patent: Mar. 19, 2024

(54) DEVICE FOR DISPLAYING ONE OR MORE TRANSIENT ANIMATED IMAGES FROM THREE-DIMENSIONAL MICROSTRUCTURES AND USES OF SUCH A DEVICE

(71) Applicant: KARMIC SÀRL, Renens (CH)

(72) Inventor: Yit-Shun Leung Ki, Renens (CH)

(73) Assignee: KARMIC SÀRL, Renens (CH)

( * ) Notice: Subject to any disclaimer, the term of this patent is extended or adjusted under 35 U.S.C. 154(b) by 471 days.

(21) Appl. No.: 17/353,585

(22) Filed: Jun. 21, 2021

(65) Prior Publication Data

US 2021/0309038 A1 Oct. 7, 2021

Related U.S. Application Data (63) Continuation of application No. PCT/EP2019/086728, filed on Dec. 20, 2019.

(30) Foreign Application Priority Data

Dec. 21, 2018 (WO) ................ PCT/EP2018/086770

(51) Int. Cl.
  *B42D 25/29* (2014.01)
  *B42D 25/328* (2014.01)
  *G02B 5/18* (2006.01)

(52) U.S. Cl.
  CPC ........... *B42D 25/328* (2014.10); *B42D 25/29* (2014.10); *G02B 5/1885* (2013.01)

(58) Field of Classification Search
  CPC .... B42D 25/328; B42D 25/29; B42D 25/324; B42D 25/373; B42D 25/425; B42D 25/44; G02B 5/1885; G02B 5/1842; G02B 5/09; B41M 3/148
  USPC ............................................................ 359/2
  See application file for complete search history.

(56) References Cited

U.S. PATENT DOCUMENTS

| | | | |
|---|---|---|---|
| 5,059,245 A | 10/1991 | Phillips et al. | |
| 8,786,521 B2 * | 7/2014 | Kaule | B42D 25/342 345/9 |
| 2008/0258456 A1 | 10/2008 | Rahm | |

(Continued)

FOREIGN PATENT DOCUMENTS

| | | |
|---|---|---|
| DE | 10 2010 047 250 A | 6/2011 |
| EP | 1966769 B2 | 3/2018 |

(Continued)

OTHER PUBLICATIONS

International Search Report and Written Opinion for PCT Application No. PCT/EP2019/086728, filed Jun. 25, 2020.

(Continued)

*Primary Examiner* — William R Alexander
(74) *Attorney, Agent, or Firm* — Fleit Intellectual Property Law; Paul D. Bianco; Gary S. Winer (57) ABSTRACT

A device includes at least one transient image having optical properties which vary depending on the angle of observation, with the image(s) consisting of a set of three-dimensional microstructures arranged in a plurality of subsets. Each subset consists of microstructures having an equivalent or identical planar angle Θ. A security document can include such a device and the device can be used as a security element.

18 Claims, 6 Drawing Sheets

(56) References Cited

U.S. PATENT DOCUMENTS

| | | | |
|---|---|---|---|
| 2010/0090455 A1* | 4/2010 | Boswell | B42D 25/29 283/57 |
| 2010/0182221 A1* | 7/2010 | Kaule | B42D 25/342 345/9 |
| 2011/0033664 A1* | 2/2011 | Dicker | B42D 25/29 264/293 |
| 2012/0268598 A1* | 10/2012 | Holmes | B42D 25/40 348/143 |
| 2012/0319395 A1 | 12/2012 | Fuhse | |
| 2018/0117949 A1 | 5/2018 | Fuhse | |

FOREIGN PATENT DOCUMENTS

| | | |
|---|---|---|
| EP | 9839337.3 | 6/2020 |
| WO | 1993/00224 A1 | 1/1993 |
| WO | 2015/150052 A1 | 10/2015 |
| WO | 2016/177470 A1 | 11/2016 |
| WO | 2020/128000 A2 | 6/2020 |

OTHER PUBLICATIONS

EP Application No. 9839337.3, EPO Notice intend to grant a patent; dated Oct. 19, 2023.

\* cited by examiner

DEVICE FOR DISPLAYING ONE OR MORE TRANSIENT ANIMATED IMAGES FROM THREE-DIMENSIONAL MICROSTRUCTURES AND USES OF SUCH A DEVICE

TECHNICAL FIELD

The present invention relates to the field of the securing of objects, and more particularly to the security elements designated as "level 1", for which the principal authentication tool is the naked eye and which are able to be affixed or integrated on objects which are to be made secure.

More particularly, the present invention concerns a device comprising a substrate, a surface or portion thereof, upon which an array of microscopic relief elements is structured and where the relief elements comprising said array are organised into subsets in such a manner as to display transient images in a dynamic manner by specular reflection of incident beams of light from said subsets.

The invention will find a particular, but not, however, exclusive application in the securing of documents such as identity cards or official documents, but also the securing of bank notes.

BACKGROUND

The level 1 copy protection security elements (hereafter "visual authentication elements") are essential for the securing of security documents. The numerous existing solutions can be classified in two broad categories:

Authentication Features based on pigments or on colorants having optically variable properties and generally applied by printing, such as described in U.S. Pat. No. 5,059,245, and Authentication features based on relief elements, such as described in the documents WO1993000224, WO 2015/150052, EP1966769 and DE102010047250.

Among the visual authentication features based on relief elements, a distinction is made between the diffractive features, such as described in WO199300224, which are characterized by a strong iridescence dependent on the viewing angle, and non-diffractive elements, such as described in EP1966769 and DE102010047250, which, in turn, are characterized by properties of optical variability obtained by reflection or by refraction of light.

Compared to diffractive features, non-diffractive features present two advantages. In the first place, non-diffractive features are not iridescent. The iridescence is indeed optically variable, but gives rise to visual elements which are difficult to differentiate between one another. This is not the case for the non-diffractive features where the absence of iridescence concentrates the attention of the observer on the images, indicia or other visual effects displayed. The second advantage is that the equipment necessary for the realization of non-diffractive features is specialized and currently less common than that necessary for the production of diffractive elements. To illustrate this ubiquity of means, the following website: http://smartii.org/downloads/hologram-kit-your-own-hologram-lab-in-a-box/ proposes a "kit" for the realization of diffractive structures at a moderate price.

Finally, it is to be noted that diffractive structures are very sensitive to pollution and must first be generated on a relatively small substrate dedicated to this purpose (an operation designated as "origination" in the parlance of Holography). In addition, diffractive structures are rapidly "filled", by ambient dust, the storage environment (e.g. wallet) or else by the simple handling of the carrier substrate, to such an extent that they become invisible after a few months of use. As a result, for all long-term use of such an element on a security document (e.g. bank note, identity card or passport), the diffractive relief composing the feature must imperatively be protected. This protection necessitates a complexing of the security element through the replication by electroforming of the structure onto a nickel tool (called a "shim"), used for reproducing the diffractive structure in a resin which will then be integrated in the core of a metallized multi-layer web, commonly designated as "foil". This need to protect the basic diffractive structure of a diffractive security feature to give it an appropriate durability considerably increases the cost and complexity of implementation and inherently limits their exploitation.

Visual authentication security features characterized by properties of optical variability obtained by reflection or by refraction of light are, however, very few in practice. Examples are described in EP1966769 A1 and DE102010047250. These non-diffractive security elements are characterized by wedge-shaped relief elements the bases of which are laid out in the plane of the substrate on which they formed, and a height which extends beyond said plane in substantially perpendicular projection thereto, thus defining inclined reflection/refraction planes, the optical variability of which is ensured by judiciously modifying the out-of-plane angle ("alpha" angle in DE102010047250) of each relief element with respect to its neighbour.

A major disadvantage of the wedge-shaped relief elements taught by EP1966769 and DE102010047250 resides in the great difficulty of controlling the out-of-plane angle of the inclined reflection/refraction plane of each wedge, the dimensions of which in the plane, respectively the in-plane side lengths of each wedge, are of the order of 30 μm×30 μm. The required out-of-plane precision is only possible today on surfaces typically smaller than 100 mm×100 mm. Consequently, the security element described by the prior art necessarily implies transfer onto a nickel shim (Ni), in the same manner as the diffractive features previously described. In other words, the only difference between a wedge-based non diffractive feature as disclosed by prior art and diffractive feature is by the type of optical phenomenon which is used to induce an optical variability. It otherwise remains substantially identical with regard to the implementation modalities.

Another major disadvantage of the wedge-shaped relief elements of EP1966769 and DE102010047250 lies in the fact that the height of the out-of-plane relief elements is not uniform over the entire image. Indeed, the human eye is very sensitive to in-plane differences in size between microrelief elements. Thus, even a single wedge of out-of-plane height, different from all the others on the same image will be visible to the naked eye and will be interpreted as a "defect" by the observer. Thus, in-plane, the elements must all have the same size and it follows that to arrive at wedges characterized by different out-of-plane angles, it is the height or depth of each element which must vary. The non-uniformity of height renders delicate any reproduction of the authentication element by printing techniques such as intaglio or rotogravure where the ink is spread on the substrate to be printed in a totally uniform manner.

Finally, a last disadvantage of the security features comprising wedge-shaped relief elements is that in practice the visual effects which are produced are blurred compared to what is desired. In fact, the specialist in the art knows that currently, at the desired relief height scales, i.e. in the order of 2-5 µm, the available techniques for generating an authentication feature within a reasonable period of time are very limited.

A usable technique would be, for example, greyscale lithography. According to this method, a photosensitive resin is spread on a plate, it is then exposed by pointwise bursts of UV-laser illumination according to a regular grid, the beam intensity can be varied from shot to shot. After development of the plate, the depth at each shot point is substantially proportional to the intensity of the programmed laser beam at this same point. A first source of imprecision comes from this discretization of the height along a regular grid of points, the minimal spacing of which is limited by the wavelength of the laser beam. For UV radiation (365 nm) to which photosensitive resin is typically sensitive for example it is at best 0.6 µm×0.6 µm. Thus, the data transmitted to the grayscale photolithography machine is already inherently imprecise due to this "sampling" effect. A wedge having a smooth facet or inclined reflection/refraction plane is possible by combining a defocusing of the laser with a development protocol suitable for the desired structure. In return, it will be difficult to distinguish in a reliable manner two out-of-plane angles of two close wedges. In addition, the relief junctions must imperatively be smoothed so as to permit the transfer by galvanoplasty. The result thereof is that the authentication feature produced according to this method will be blurred.

DE 102010047250 A1 refers to a security device and respective manufacturing process. The security device encloses a carrier with reflective surface parts and variety of pixels. Each pixel exhibits at least one reflective facet with specific orientation and coincidentally variation.

WO 2016177470 A1 discloses a similar optically variable security device. The device includes a motive, which shows a curve display depending on the viewing angle.

A great need therefore exists for visual authentication features which are easier to identify than diffractive features and more flexible in implementation than the existing non-diffractive elements known from the prior art.

This results technically in the need for a greater precision in displaying of the desired visuals, a widened compatibility of the microrelief elements composing the element with industrial printing techniques permitting a better registration of the element, and a reduction in costs so as to permit the multiplication of the security elements on the same security document, thus reinforcing its inviolability.

SUMMARY OF THE INVENTION

One of the aims of the invention is therefore to remedy the aforementioned disadvantages and to respond to the aforementioned needs by proposing a device as set forth herein.

This device comprises a set of three-dimensional microstructures (hereafter and interchangeably: "microstructures" or "microrelief elements") having at least one optically reflective face, and behaving as micro-mirrors. These microstructures are formed on the surface of a substrate defining a plane P upon which a base of each microstructure extends. The device of the invention is characterized by an arrangement of said microstructures in a plurality of subsets of microstructures presenting at least one azimuthal planar angle $\theta$ identical to all microstructures within a given a subset, where $\theta$ is defined between a direction parallel to at least one reflective face of said microstructure and a fixed reference axis of the device in the plane P. In addition, the azimuthal planar angle(s) $\theta$ identical and common to the microstructures of one or more subsets are also different from those of the microstructures constituting other subsets present in said device, so as to display at least one transient image having variable optical properties depending on the angle of observation.

In the sense of the present invention, the azimuthal planar angle $\theta$ corresponds to the angle, in the plane P of the surface of the substrate on which a said microstructure is formed, between an axis parallel to at least one reflective face of said microstructure and a fixed reference axis of the device. The two above-mentioned axes are parallel to the plane P, in which the azimuthal angle $\theta$ is situated, which is therefore totally independent of the height of the microstructures, as opposed to the wedge-shaped relief elements of the prior art. Consequently, the visual effect displayed by a non-diffractive security feature according to the device of the present invention is independent of the height of the microstructures, or their in-plane shape.

Contrary to the techniques of the prior art, the device of the invention permits the realization of non-diffractive security features according to simple and reproducible methods of realization and to a high degree of precision, even at a large scale. In fact, the three-dimensional microstructures of the inventive device can be realized for example by any process including at least one step of photolithography followed by an etching step. These methods are well known and mastered by the specialist in the art and permit in particular the etching of microrelief elements directly onto printing plates of, dimensions in the order of 1 m×1 m, which are compatible with the methods of transfer by rotogravure, by intaglio or else by lamination of security documents such as identity cards or passport datapages.

In addition, the aforementioned realization methods present the advantage of permitting a simultaneous formation of all the subsets of microstructures of a given device on the same substrate. As all the microrelief elements composing the non-diffractive feature according to the invention are etched simultaneously, they are therefore all substantially of the same height or depth.

Finally, a significant advantage of the invention lies in the very great precision of the azimuthal angle $\theta$ of a subset of microstructures according to the device of the present invention with respect to the desired value. Thus, when the microstructures are obtained by photolithography-etching as previously mentioned above for example, the maximum angular error on the azimuthal planar angle $\theta$ for a subset of microstructures sharing the same azimuthal planar angle is given by the arctangent of the ratio between the spatial resolution of the photolithography and the length of each microstructure of said subset. A typical maximum error is 0.5 degrees for a microstructure having a length of 150 µm. In addition, if further visual sharpness is desired, it is sufficient to lengthen the relief element.

The device of the invention thus permits displaying at least one transient image presenting optically variable properties depending on the angle of observation, and the said transient image being displayed with a greater degree of sharpness in comparison with the images obtained according to the non-diffractive techniques of the prior art.

In the device according to the invention, the specular reflection is modulated for each subset of microstructures by the planar azimuthal angle $\theta$ of at least one of its faces.

According to an embodiment of the inventive device, each microstructure is an identical or substantially identical substantially prismatic element for each microstructure of a subset, said prismatic element having two opposite faces and differentiated from one another solely by the azimuthal angle of said microstructure.

The microstructures, and more particularly the base thereof in the plane of the surface on which they are formed, can cover different shapes, more specifically different trilateral or quadrilateral forms, with straight or curved side, such as a square, a prism, a diamond, a parallelogram, a triangle or substantially triangular shape. Likewise, they can present at least three reflective facets, forming inclined planes extending from the base upwards with respect to the plane P in which the base extends. In these cases, each microstructure will be characterized by as many azimuthal angles θ as there are inclined planes.

At a certain fixed illumination angle, all the facets of said microstructures in the form of a prism presenting the same given azimuthal angle θ reflect the light towards the observer. According to this first advantageous characteristic of the invention, the transient image displayed at this angle therefore corresponds to the shape of the said subset of microstructures. If the device is tilted or rotated, another subset of prism-shaped microstructures, characterized by a different azimuthal angle θ to that of the first subset, will reflect light towards the observer.

It follows that a tilt or rotation of the device will display a succession of transient images, constituting an animation formed by the sequential display of the light reflections of each subset in succession. In a subset, the microstructures can be arranged in straight lines, curves, and zigzags. These can be either closed or open, or a mixture of all of the above. Thus, any succession of subsets presenting no spatial hysteresis as a function of the angle of tilt or rotation can constitute an animation according to the present invention.

According to an embodiment of the inventive device, an image comprises at least two distinct zones, themselves constituted by subsets forming an animation such as previously described. The two zones are respectively a first zone designated as a transient image zone, and at least one other zone designated as latent image zone, in which microstructures constituting subsets are solely assigned to one of these at least two image zones.

These image zones are distinguished from one another by the fact that the azimuthal planar angles θ of the microstructures in each of the said zones present a non-linear dependence to at least one direction s common to all the image zones.

According to the present invention, this function θ(s) is different for each of the said zones. Advantageously, the non-linear functions in each of the said zones form part of the same family of curves passing through the same value θ for at least one and preferably two values of s.

More specifically, according to preferred embodiments of the invention, the functions θ(s) in each of said zones are arctangent functions described by:

$$\theta(s); s_{st} \leq s \leq s_e \quad (1)$$

$$\theta - \theta_0 = B \tan^{-1}[k(s-s_0)] \quad (2)$$

where:
- $s_{st}$ is the start of the range of the values in the dimension s for the whole of said zones and microstructures,
- $s_e$ is the end of the range of the values in the dimension s for the whole of the said zones and microstructures,
- and $\theta_0$ and $s_0$ are the respective median values of θ and of s in the said range.

Furthermore, the azimuthal planar angle θ is different for each zone, and defined by different variables B and k such that:

$$B = \frac{2(\theta - \theta_0)}{\pi} \quad (3)$$

and $$k = \frac{1}{(s_{st} - s_0)} \tan\left[\frac{\theta - \theta_0}{B}\right] \quad (4)$$

where $\alpha_c$ is an asymptotic value of θ when s→∞ or s→−∞.

Preferably, the dependence of θ on s is described by a portion of said arc tangent function.

The two embodiments previously described exploit advantageously the organization of microstructures in subsets for the display of transient images designated as "dynamic".

The freedom of shape for the bases of the microstructures permits—within the framework of the embodiments of dynamic transient images previously described, for example, the tight packing of the microstructures with the aim of maximizing their surface density, thus multiplying the quantity of light reflected at a given azimuthal angle θ. It is also exploited advantageously for realizing transient images designated as "fixed". In a fixed transient image, different motifs are displayed in the zone of the image at different viewing angles, to the exclusion, or very nearly, of the motifs which are visible at other viewing angles.

In an embodiment of fixed transient images, an azimuthal angle is assigned to the foreground and another different azimuthal angle is assigned to the background of each of the motifs to be displayed in the context of said transient image. For example, if one of the motifs to be displayed is a star, an azimuthal angle is assigned to the star (foreground) and another azimuthal angle to the remainder of the motif (background), this being for each of the motifs that are to be displayed.

To display n motifs in a fixed transient image, n being a whole number greater than 1, and said transient images being each respectively visible at different viewing angles, $2^n$ permutations of spatial overlap are possible (for example a possible permutation for n=3 is: foreground of the motif 1 overlaps at the same location the backgrounds of the motifs 2 and 3) between the foreground and background of the each of the n motifs with one another, at any given spatial location within the image and there will be n azimuthal angles $\theta_n$ to be reproduced on the microstructures which are to be found there. In this same embodiment of fixed transient images, the form of the base of the microstructures and their arrangement are selected in such a way as to be able to reproduce these n azimuthal angles in each of the $2^n$ types of overlap zones (corresponding to the $2^n$ overlap permutations) present on the image.

To maximize the visual contrast between the foreground and background of a motif at the observation angles where this is visible, it is advantageous to assign to them azimuthal angles θ spaced as far apart from one another as possible. Likewise, for n motifs which are to be displayed, it is advantageous to distribute the required 2n azimuthal angles $\theta_1, \ldots, \theta_n$ in a regular manner over an arc of 180° and pack the microstructures as tightly as possible so as to maximize the amount of reflected light. However, depending on the requirements of a given motif and the precision of the method used for its realization, any set of sufficiently distinct azimuthal angles can be assigned to implement a fixed transient image according to the present invention.

The motifs can advantageously represent a design, in the shape of at least one alphanumeric character, at least one representation such as a portrait or a flower or any other representation or a mixture of the above.

In accordance with various particular and advantageous characteristics of the device of the invention:
- at least one side of the faces of the said microstructure presents a length greater than 30 μm, preferably of at least 60 μm;
- the microstructures or the subsets are covered in totality or partially or cover at least one layer modifying the optical properties of the microstructure,
- the layer modifying the optical properties of the microstructure comprises at least one polymer, functionalized or not, at least one metallic layer or a layer having a refractive index which is different from that of the material composing said microstructures.

According to various forms of implementation of the device of the invention, the microstructures can be formed on:
- a first substrate forming an original Master,
- a tool such as a flat or curved cliché,
- a lamination plate,
- a nickel Shim, for the purpose of wrapping around a printing cylinder, a mould insert or a mould, including the negative of said microstructures,
- a substrate, particularly a polymer film,
- at least one layer of a stack of polymer films, of paper or a mixture of the two.

The microstructures can thus be printed, etched, embossed, or moulded on at least one of the faces of a substrate so as to form a three-dimensional structure.

The substrate can, furthermore, be of polymer, of ceramic, of paper, of a packaging material, a bank note, a bank or credit card, an identity document, a glass surface, a metal surface, a security thread, an individualized strip or a zone on the substrate.

An advantageous embodiment of the device of the invention provides, furthermore, the formation of the microstructures above a layer presenting substantially uniform optical properties, said layer being able to be arranged on the reverse of the surface carrying said microstructures or on any one of the other layers in a stack of polymer films and said microstructures being formed at least partially above said layer.

In such an embodiment, the optically uniform layer will be advantageously formed of a diffractive network, of one or more transparent thin layers arranged in such a way as to display an interferential optical effect, of a block of printed ink or a combination of these latter.

Finally, the invention also concerns a security document such as a bank note, an official document, an identity document, a packaging or a finished product including a device according to any one of the preceding claims.

BRIEF DESCRIPTION OF THE DRAWINGS

The invention will be better understood on reading the detailed description of preferred embodiments of the invention, carried out in relation to the attached figures, among which.

DETAILED DESCRIPTION

The present invention will be described in more detail, with the aid of several non-restrictive examples.

The device of the invention 1 is a security device of reflective type, characterized by an arrangement of microstructures in a plurality of subsets, each consisting of microstructures presenting at least one identical azimuthal planar angle θ, this angle θ being defined for each microstructure between a direction parallel to at least one reflective face of said microstructure and a fixed reference axis of the device in a plane P containing a base of each microstructure. The arrangement of the microstructures of the device of the invention along an azimuthal angle θ in the plane P is fundamentally different from the arrangement of the microstructures along an altitudinal angle α, perpendicular to the base plane according to the prior art, as described in EP1966769 and DE102010047250. The arrangement of the device of the invention remedies the previously mentioned disadvantages of the prior art in particular by permitting microstructures all having substantially the same depth or height, by permitting the realization of said microstructures over a large area, without complexing by means of an intermediate support and finally by improving substantially the sharpness of the images.

The device according to the invention 1, efficiently combats counterfeiting and is composed of a set of specific three-dimensional microstructures such as those represented in FIGS. 2, 5A to 5C and 6A to 6B. The device has the advantage of being robust against photocopying or methods of digital reprography.

The three-dimensional microstructures, for example 11, 41, 61, possess at least one optically reflective facet acting as micro-mirrors and are structured in the form of relief elements present on a surface and formed by all appropriate means, as will be described below.

In accordance with the invention, said microstructures are arranged in a plurality of subsets, each consisting of those microstructures presenting at least one identical azimuthal planar angle θ. In addition, the azimuthal planar angle(s) θ common to the microstructures of one or more subset(s) are different from those of the microstructures constitutive of other subsets present in said device, so as to display at least one transient image presenting variable optical properties as a function of the observation angle.

In the sense of the present invention, the azimuthal planar angle θ corresponds to the angle in the plane of the surface of the substrate on which a said microstructure is formed, between a direction parallel to at least one reflective face of said microstructure and a fixed reference axis of the device.

One of the advantages of the invention lies in the multiplicity of shapes that the microstructures, and more particularly the base of these, can adopt, obtaining a multiplicity of attainable potential transient images for the device of the invention. Thus, the base of each microstructure can be of square, rectangular, diamond, parallelogram, triangular, pyramidal, zigzag or very elongated shape, or a mixture of these shapes, along one direction with respect to the other directions characterizing the shape of the said microstructure.

In the sense of the present invention, the microstructure shapes as described extend per se, but also cover substantially the same said shape. Indeed, during the formation of the microstructure according to the desired shape by the methods described below, the desired shape can be obtained per se, but also a shape which is substantially close, reflecting the deviations from the desired shape; caused by artefacts, defects, positional errors and other inaccuracies inherent to any manufacturing process.

In the sense of the present invention, a transient image corresponds to the locus encompassing all the microstructures on a device having at least one facet sharing the same azimuthal angle θ. In a first embodiment of the invention, an animated image will be constituted of several subsets of microstructures representing a same motif or the evolution in space of a same motif without spatial hysteresis. These several subsets will be spaced apart by at least 10 micrometres, preferably more than 30 micrometres and preferably less than 200 micrometres, the microstructures belonging to each subset representing a motif, or the evolution of a particular motif have an identical azimuthal angle θ and which will be close to those of the microstructures assigned to the adjacent subsets. In the case where the motif will be a line or a straight line or a curve, this will be repeated or will evolve in a space a number n of times and will therefore be characterized by n subsets (11), each of these subsets being composed of microstructures having an azimuthal angle $θ_i$ the angles $θ_1$, $θ_2$, $θ_3$ etc . . . being different and reflecting the light at a given viewing angle—but close for each successive $θ_i$.

Due to the spacing and the multiplicity of transient images present in a given space and in conjunction with the observation under different close and successive observation angles, the represented motif will appear as an animation. The angular difference θ assigned to two adjacent subsets is typically less than 2° and preferably less than 0.5°.

Figure 1:
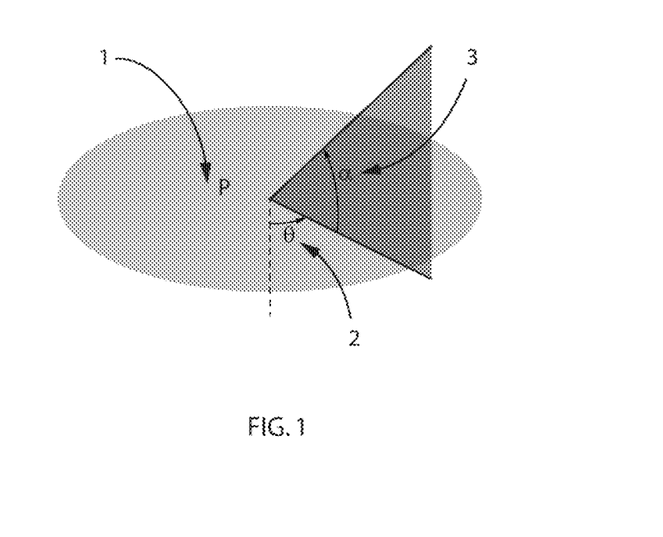
FIG. 1 illustrates schematically the difference between an altitudinal angle α, perpendicular to the plane P of the image formed by the facets of the microstructures of the prior art and the azimuthal angle θ in the plane P of the image formed by the microstructures of the device of the invention.
Figure 2:
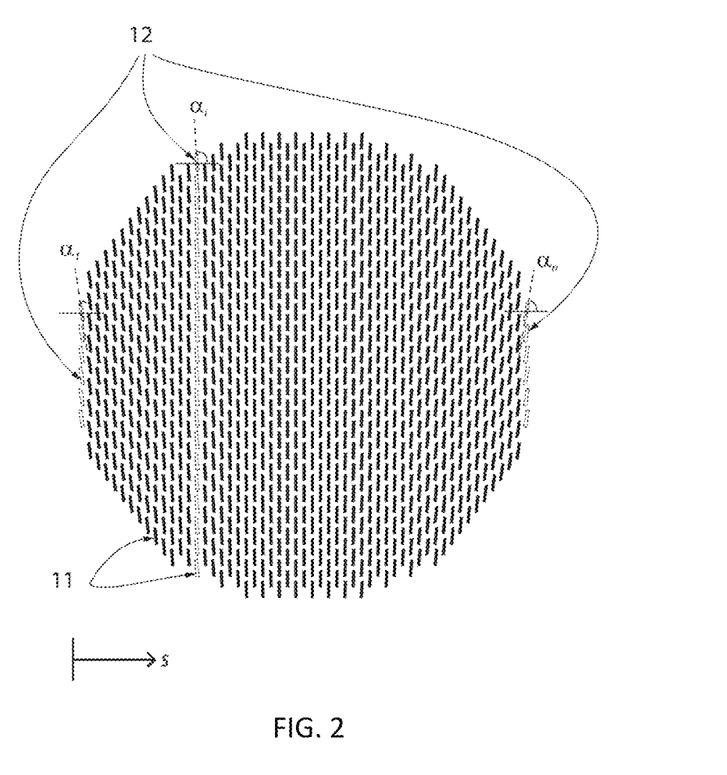
FIG. 2 illustrates schematically a device according to the invention including a series of microstructures of prismatic shape, oriented at an azimuthal planar angle θ, dependent on the distance s, said microstructures being arranged in subsets in the form of several transient images having the shape of a vertical line. The lines displaying successively, when the device is tilted or rotated, in such a way as to form an animation which appears continuous to the human eye according to an advantageous characteristic of the device of the invention.
Figure 3:
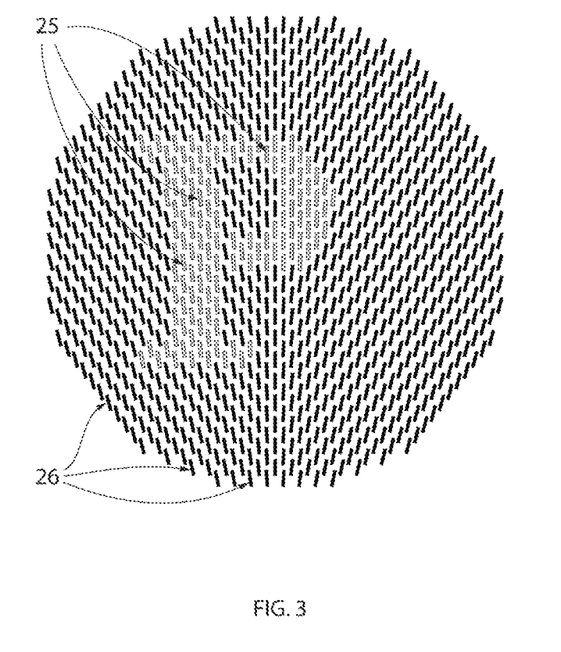
FIG. 3 illustrates schematically another embodiment of the invention, namely the arrangement of microstructures associated with a transient image zone and a latent image zone for displaying a dynamic latent image according to one of the advantageous characteristics of the invention.

In a second embodiment of the invention, a transient image as previously described is used for revealing a latent image, difficult to perceive if the latter were present alone, in the absence of a transient image. In this second embodiment, the entire image is constituted of at least two distinct image zones, respectively a first zone designated as transient image zone (25) and at least one other zone designated as latent image zone (26). Each image according to this second embodiment of the invention is thus defined by at least two zones corresponding to a transient image to which a latent image is added, as represented in FIG. 3. The animated image thus obtained can be realized in such a manner that it displays a latent image such as (but not limited to) a design, alphanumeric characters or a machine-readable code.

In this embodiment, the microstructures with an identical azimuthal angle α, constitutive of sub-sets, are solely assigned to one of these at least two image zones (transient or latent). In these different image zones, the azimuthal planar angles θ of the microstructures present a non-linear dependence to at least one direction s common to all the image zones, defined by a different suitable function θ (s) for each of the said zones. Furthermore, the non-linear functions θ (s) in each of the said zones form part of the same family of curves passing through the same value θ for at least one, and preferably two value(s) of s.

In a preferred embodiment, each of the said at least two image zones is an inverse trigonometrical function θ(s) such as an arctangent, differing from one zone to the other by a different asymptotic value of $θ_{(s)}$ when s→∞ and/or s→−∞.

Said inverse trigonometric functions are expressed by:

$$θ(s); s_{st} \leq s \leq s_e \tag{1}$$

$$θ - θ_0 = B \tan^{-1}[k(s - s_0)] \tag{2}$$

where:
$s_{st}$ is the start of the range of the values in the dimension s for the whole of the said zones and microstructures
$s_e$ is the end of the range of the values in the dimension s for the whole of the said zones and microstructures
and $θ_0$ and $s_0$ are the respective median values of θ and of s in the said range.

Figure 4:
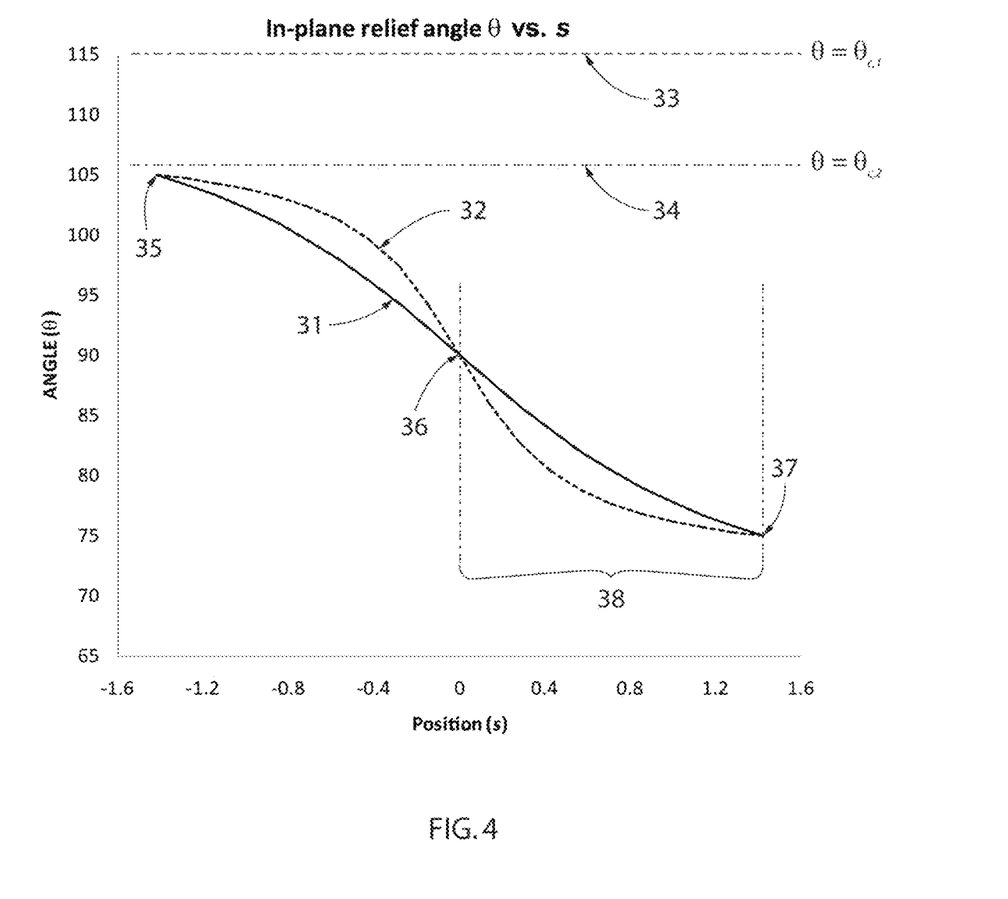
FIG. 4 illustrates schematically the ratios between the angle θ and the distance s between the microstructures associated with the transient image zone and the latent image zone for displaying a latent image according to one of the advantageous characteristics of the invention.
Figure 5A:
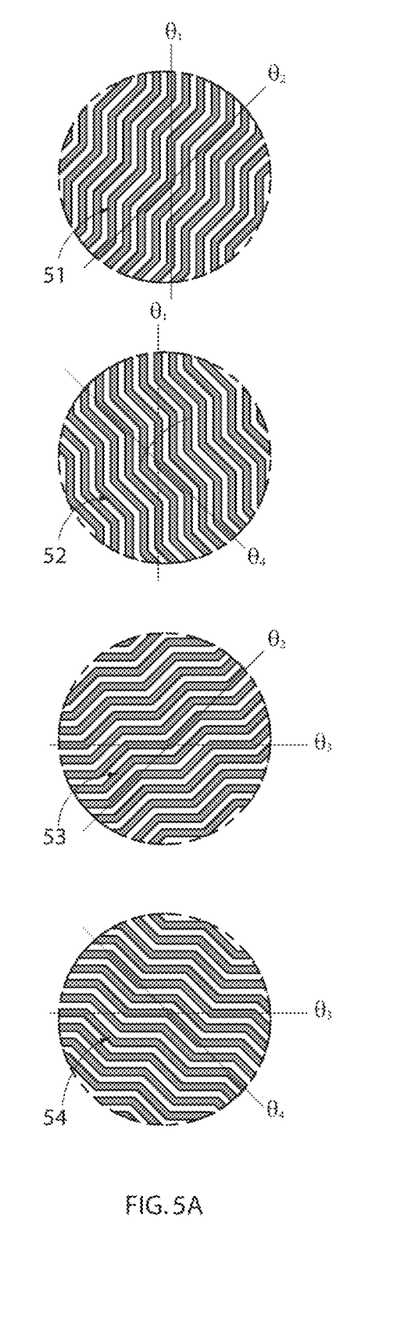
FIG. 5A illustrates schematically different subsets including different types of microstructures arranged in a zigzag manner so as to display two fixed transient motifs at two different viewing angles.
Figure 5B:
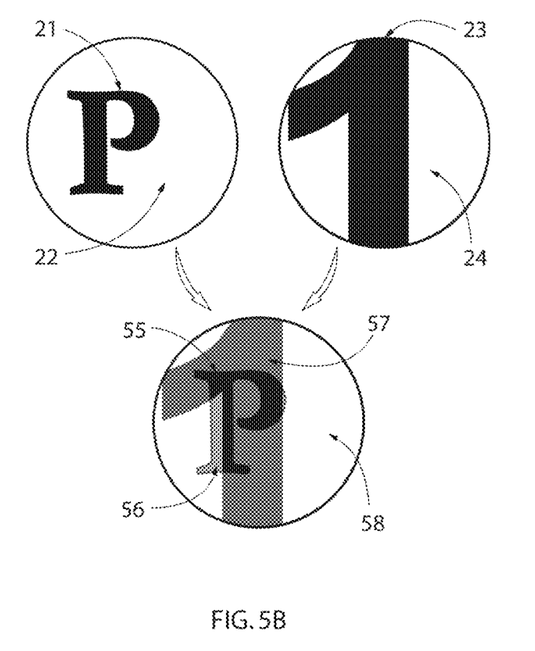
FIG. 5B illustrates schematically the arrangement of the subsets as a function of the zones of the device for displaying two fixed transient motifs at two different viewing angles.
Figure 5C:
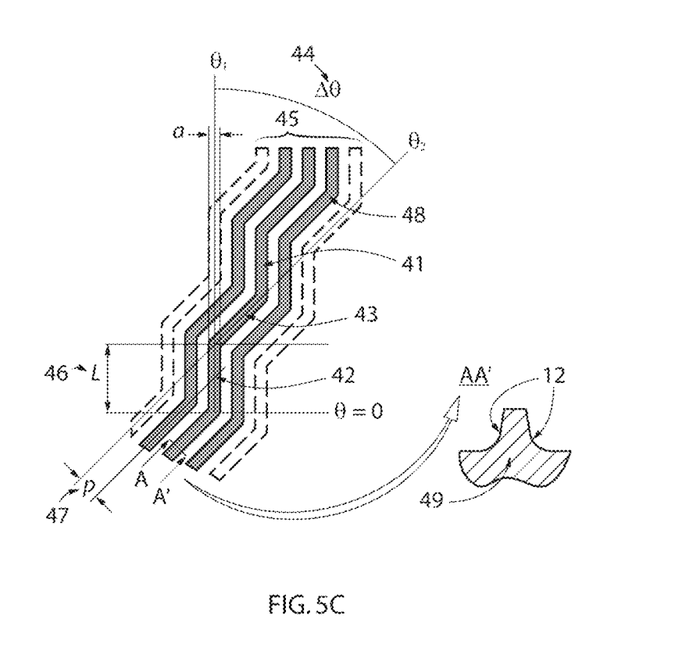
FIG. 5C illustrates a cross-section along a plane A-A' of an element of this microstructure in a zigzag manner.

Furthermore, the azimuthal planar angle θ is different for each zone, and defined by different variables B and k such that:

$$B = \frac{2(θ_c - θ_0)}{\pi} \tag{3}$$

and $$k = \frac{1}{(s_{st} - s_0)} \tan\left[\frac{θ_{st} - θ_0}{B}\right] \tag{4}$$

where $α_c$ is an asymptotic value of θ when s→∞ or s→−∞. As shown specifically in FIGS. 3 and 4, the microstructures associated with the transient image 25 and the latent image 26 of the image, whilst being arranged according to the above formula, have different values B and k defined by a different asymptotic value of θ assigned to each subset of associated microstructures respectively the transient image and the latent image of the image. In FIG. 3, the curve 31 represents the dependence of θ as a function of s for the associated microstructures the transient image 25, and the curve 32 that of the microstructures associated with the latent image 26. The two curves are characterized by different azimuthal planar angle θ values. The transient image will be displayed by the offset between the animation of the transient image in the foreground and that of the latent image in the background as a function of the azimuthal angle θ1.

Furthermore, as indicated by FIG. 4, there is no offset between the animations of the transient image 25 and the latent image 26 at the points 35, 36 and 37 of the curves 31, 32. In fact, at these points the value s is equal to $s_{st}$, $s_0$ and $s_e$. The visibility of the transient image is maximised between these points, but the foreground and background are, on the other hand, from the point of view of the observer, merged at these same points. For the display of certain images, the overlap of the values of θ at the point 36 ($s_0$) may be undesirable. A preferred advantageous alternative according to the invention therefore consists of only using the half-arctangent 38, substituting $θ_e$ for $θ_0$ and $s_e$ for $s_0$ in the equations (1)-(4) above for the calculation of the values B and k.

By complying with this conformation and this organisation of the microstructures, it is thus possible to display one or more latent images, which appear as revealed by the transient image. Advantageously, because the angles θ of the microstructures associated respectively with the latent and transient images are identical at at least one and preferably two values of s, the difference in angle θ between microstructures associated with the latent images and transient images respectively remains sufficiently small at every value of s, such that the latent image(s) are only visible when the transient image is also visible.

For the previously described embodiments, the microstructures are spaced apart with respect to one another by at least 10 micrometres and preferably by between 30 and 200 micrometres. So as to ensure the perception of continuity of animation of a transient motif according to the previously described embodiments, the number of subsets must be maximized, and they will be preferably spaced apart with respect to one another by a distance identical to the spacing of the microstructures themselves. Finally, it follows from the above description that the distances and the spacings of the, respectively, microstructures and subsets constitutive of a latent image are identical to those of an animated transient image.

The whole of the above-mentioned embodiments forms transient images designated as "dynamic" and have as a common characteristic the displaying of an animation when the carrier substrate of said images is inclined or turned.

In another embodiment, the microstructures organised into subsets are arranged in such a way as to display n fixed transient motifs where n is a whole number greater than or equal to two. For this embodiment, each of the n fixed transient motifs which are to be displayed includes a foreground and a background which are mutually exclusive, and the microstructures of the device are arranged in $2^n$ types of subsets corresponding to the possible permutations of overlap between the foreground and background of the n different fixed transient motifs. The total number of subsets will be exactly equal to the number of zones where the foreground and background of the n images overlap.

Thus, for the case of a double image where n is equal to 2, the shape of the microstructures can be adapted to display either one or the other of two distinct images, each formed of a foreground 21, 23 and of a background 22, 24, along the relative angle between the illumination and the position of the observer.

The two images can overlap one another spatially. For this double image effect, the microstructures are arranged in a common plane in zigzag manner, the section of each branch of the zigzags including at least one facet.

An example of a microstructure adapted to display a double image is an element able to be assimilated to a prism of width "a" of at least 0.8 micrometres and preferably between 5 and 50 micrometres and of any cross-sectional shape 49 having at least one reflective surface S, forming, in its lengthwise direction, a zigzag where the azimuthal angles, $θ_1$ and $θ_2$ of the successive branches 42, 43 swing by more or less Δθ 44. This type of subset 41 can be arrayed in a regular or irregular tiling 45 of relief elements of the same type. In this arrangement, the length 46 of each branch of the zigzag subset is independent of the spacing 47 between this latter subset 41 and its neighbour 48 in the tiling.

The double image is formed of several subsets of microstructures. One of four types of microstructures (FIG. 5A) is assigned to each subset. Said microstructures are arranged in a zigzag manner, characterized by branches 51, 52, 53, 54 having as successive azimuthal angles respectively $θ_1$ and $θ_2$, $θ_1$ and $θ_4$, $θ_2$ and $θ_3$, or $θ_3$ and $θ_4$. These four types of microstructures arranged in a zigzag manner correspond to the zones (FIG. 5B) where, respectively: the foreground of the first image intersects with that of the second image at 55, the foreground of the first image intersects with the background of the second image at 56, the background of the first image intersects with the foreground of the second image at 57 and finally the two backgrounds of the first and the second image intersect at 58.

The azimuthal angular difference, Δθ, between two arms of the same zigzag depends on the azimuthal angles $θ_1$, $θ_2$, $θ_3$ and $θ_4$ assigned to the foreground and the background of each image. In a preferred embodiment of the present invention, Δθ is 45°. As previously described, the set of microstructures arranged in a zigzag manner is characterized by a spacing in the plane which is controllable and independent of the length of the branches. This innovative characteristic of the present invention permits increasing the amount of light reflected by a subset of microstructures, by allowing a tighter packing 47 of the microstructures, independently of the length 46 of the branches of the zigzags, the said length being substantially determined by the manufacturing method.

It is possible to realize other relief shapes with the same method used for forming the prisms previously described. For example, a prism of a length "L" much greater than the width "a", or else a prism characterized by a width "a" forming an arbitrary line in the plane. In particular, a prism of width "a" forming, in its lengthwise direction, a zigzag where the azimuthal angle of the successive branches shifts by 45 degrees. The present invention uses such zigzag prisms for displaying, in the same region, two distinct images 41, 42 at two different viewing angles, assigning a zigzag branch azimuthal angle to the foreground 43 and to the background 44 of each of the two images. For example, the azimuths 0° and 90° at the foreground and the background of the first image and the azimuths 45° and 135° at the foreground and the background of the second image. The set of zigzag prisms 45 is characterized by a spacing 46 in the plane which is controllable and independent of the length of the branches 47.

Figure 6A:
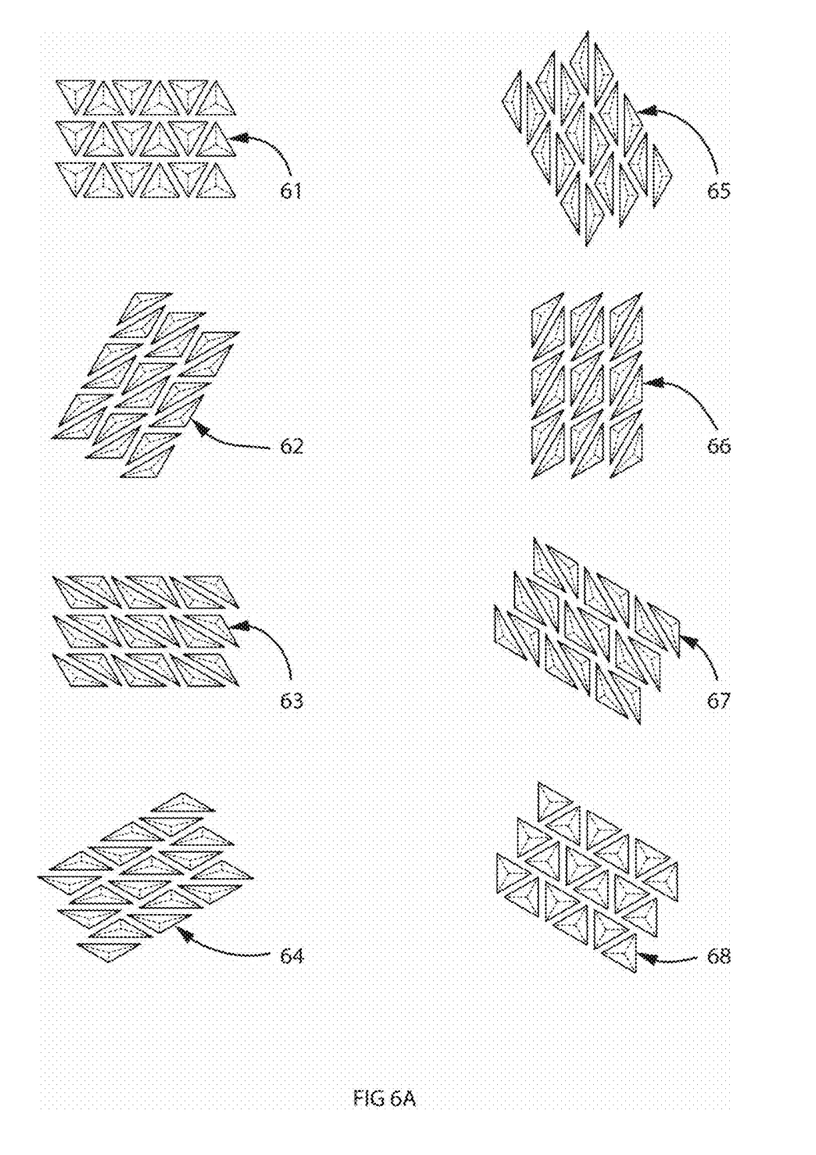
FIG. 6A illustrates schematically a plurality of three-dimensional microstructures of substantially triangular base shape, characterized by different angles θ and comprised in a subset.
Figure 6B:
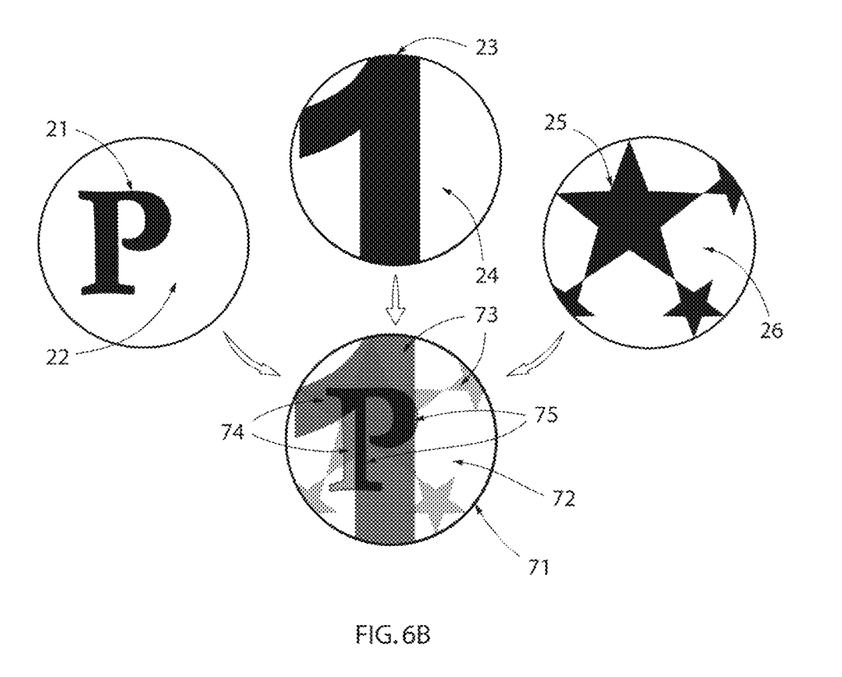
FIG. 6B illustrates schematically a triple image example using three-dimensional structures such as described in FIG. 6A.

In an analogous manner, the shape and arrangement of the microstructures can be adapted for displaying one of three distinct images, using microstructures of substantially triangular shape in the plane such as are represented in a non-restrictive manner in FIG. 6A. Following the same principle as for the double image previously described, a different azimuthal angle is assigned, respectively, to the foreground and the background of each of the three images which are to be displayed, namely six azimuthal angles in total. Preferably, and with respect to a fixed reference angle, the azimuthal angles 0, 60 and 120 degrees are assigned respectively to the foregrounds of the first, the second and the third image, and the azimuthal angles 90, 150 and 30 degrees are assigned respectively to the backgrounds of these same three images. In an analogous manner to the double image previously described, there results therefrom the 8 types of subsets referenced 61, . . . , 68) illustrated in FIG. 6A, associated with the 8 types of possible overlap zones (respectively referenced 71, . . . , 78) between the foregrounds and backgrounds of three different images illustrated in FIG. 6B.

Finally, in another embodiment of an image with n fixed transient images according to the present invention, the microstructures as represented in FIG. 6A (respectively referenced 61, . . . , 68) can each be replaced by n prismatic elements 11 arranged in such a way as to be parallel to each of the edges of the base shape of the microstructures, in this case a triangle.

The device according to the invention presents the advantage of allowing the display of a great variety of motifs or images in a dynamic manner, greatly complicating attempts at copying by conventional printing and reproduction techniques. It also presents the advantage of creating a great variability by playing on the arrangement and the shapes of the microstructures present within the device and arranged in subset form in the latter.

The spacing of the three-dimensional microstructures composing the device with one another is such that the transient images which are thus obtained do not diffract the light and consequently to not present any iridescence.

The microstructures according to the invention in the plane P of the surface on which they are formed can present a base of different forms. Thus, the base of the microstructures in the plane P can be of square, rectangular, lozenge, trapezoidal, triangular or substantially triangular even pyramidal or substantially pyramidal or a mixture of these. Regardless of the shape of the microstructures used, according to the present invention, they are provided with at least one reflective facet, this facet may be substantially flat or curved, and characterized by a specific angle θ. According to the present invention, the term "reflective" is to be understood relating to the other portions of the same microstructure, at a given illumination angle with respect to the observer.

Finally, according to the invention, the microstructures all have at least one face of lateral dimension greater than 30 μm preferably 60 μm.

In the device according to the invention, said microstructures or the subsets can be covered entirely or partially by at least one metallic layer, at least one layer modifying the initial properties and/or refractive index of the microstructure, by a layer modifying the initial properties and/or refractive index, such as but not limited to a liquid crystal polymer layer or a layer presenting birefringence properties.

The device according to the invention is particularly advantageous in that it is possible to adapt the shape of the microstructures for displaying distinct and different images at different viewing angles without loss of reflected light at the locations where the distinct and different images overlap. Furthermore, the angle modulation necessary for the dynamic display of field lines is carried out on the azimuthal angle θ in the plane P rather than on the out-of-plane inclination angle of the microstructure (angle α in the prior art), thus increasing the quality of the visual effect. Another advantage of the device according to the invention is that the quality of the displayed transient images is dependent on the precision to which angle θ can be formed in the plane P of the image, which can be increased by simply extending the length of the microstructure in the axis of the angle θ or by using a masking method having a greater precision. All these advantages remedy the above-mentioned disadvantages of the prior art.

The device according to the invention is also particularly simple, reliable and advantageous to implement, and has therefore a comparatively lower cost for this type of security device, allowing etching or direct machining of the material on the surface by a tool subsequently used, for example, for moulding, embossing, deformation or printing by means of an ink or a resin or else the application in the course of lamination by fusion of several layers of polymer with one another of the same device.

As previously mentioned, the invention permits the realizing of visual security elements of non-diffractive type by any method including at least one step of photolithography followed by an etching step. These methods permit in particular the etching of the constitutive microrelief elements onto printing plates which can have dimensions of the order of 1 m×1 m. Since all the etched relief elements are formed simultaneously, they will have a substantially identical height, in contrast with the known techniques of the prior art.

The formed microstructures have a great precision, the maximum angular error on the azimuthal planar angle θ for a subset of identical azimuthal planar angle microstructures being typically 0.5 degrees for a microstructure having a length of 150 μm. Compared with other devices known to the specialist in the art, it is distinctly easier to adapt the depth or height of the microstructures to a given application. Finally, it facilitates the integration of different shapes of microstructures, and hence different optical effects, on the same device, thus increasing the robustness against copying.

The microstructures in the device according to the invention are obtained by different techniques known to the specialist in the art such as: photolithography of a photosensitive resin lying on a substrate, followed by the etching of the latter through the resist formed by the developed layer of photosensitive resin; machining by laser ablation of a suitable substrate or else additive methods such as 3D printing.

For certain applications, in particular those designated as "roll-to-roll" for continuous printing of webs of substrate, a device according to the invention can be realized on a first plate and copied, by galvanic growth, on a thin shim made of nickel or nickel alloy sufficiently flexible to be wrapped around a printing cylinder. The above methods are listed by way of example without limiting the field of the possible methods for realizing a device according to the invention.

The microstructures forming the device according to the invention and obtained according to the methods previously described can be opaque or transparent.

Once the microstructure is obtained, it can, in an object of the present invention, be transferred directly onto a product by thermomechanical embossing. By using a combination of the methods previously described, one or more devices can be etched on metal plates used subsequently for the laminating of the polymer layers which form an identity card, passport data page or any other security document composed of layers of polymer which are laminated together. In these cases, the pressure and the temperature of the lamination process are sufficient for carrying out a permanent plastic deformation in the zones of the laminate which are directly in contact with the microstructures thus forming a device according to the invention at these locations.

More commonly, the microstructures obtained by the methods previously described are transferred according to techniques which are well known to the specialist in the art onto a substrate such as a sheet of polymer, of paper, of polymer pre-laminate or of paperboard. This substrate can be used as is as a packaging material or on a bank note made of polymer for example, in these cases the microstructure transferred on the support is an object of the invention.

The microstructure transferred on such a substrate can be transformed by adding a layer modifying the optical properties of the said microstructures, for example a layer of ink, of metal, of material having a different refractive index to the substrate or a combination of such materials. The substrate carrying the microstructure according to the present invention, whether transformed or not, can also be integrated within more complex construction such as: a self-adhesive element, a metallized strip for hot or cold application, a banking security thread or any other complex device of this type. In this context, the layer modifying the optical properties can advantageously be different from that carrying the microstructures of the device of the invention.

It follows that another object of the present invention concerns a security document such as a bank note, an official document, a packaging material including a device according to the invention, but also the use of such devices according to the invention as security elements.

The examples of images and of devices according to the invention which are presented here, as well as the different embodiments which are mentioned in no way limit in its scope the invention as claimed, they are given by way of clarification so as to better understand the invention.

Finally, it is readily evident that the embodiments are only particular illustrations which in no manner restrict the fields of application of the invention.

The invention claimed is:

1. A device comprising a set of three-dimensional microstructures, possessing at least one optically reflective face, said three-dimensional microstructures being formed on a surface defining a plane, where said microstructures are arranged in a plurality of subsets of microstructures presenting at least one azimuthal planar angle θ, defined between a direction parallel to at least one reflective face of said microstructure and a fixed reference axis of the device in the plane, identical with respect to one another within a subset and different from that of microstructures which are constitutive of other subsets of microstructures of said device, so as to display at least one transient image having optical properties which vary depending on the angle of observation, wherein the spacing and the multiplicity of transient images present in a given space in conjunction with the observation under different close and successive observation angles, a represented motif will appear as an animation, wherein an image comprises at least two distinct image zones, respectively a first zone designated as transient image zone and at least one other zone designated as latent image zone, in which microstructures constitutive of subsets are solely assigned to one of these at least two image zones, and characterized in that the azimuthal planar angles θ of the microstructures in each of said zones present a non-linear dependence, different for each of said zones, on at least one direction s common to all the image zones and wherein the non-linear functions θs in each of said zones form part of the same family of curves passing through the same value θ for at least one value of direction s.

2. The device according to claim 1, wherein each microstructure is a prismatic element, identical for each microstructure of a subset, said prismatic element having two opposite faces, differentiated with respect to one another solely by the azimuthal angle of said microstructure.

3. The device according to claim 1, wherein the microstructures of a said subset are arranged in straight lines, curves, in the form of lines of zigzag type, closed or open, or a mixture of these arrangements.

4. The device according to claim 1, wherein a base of each microstructure is located in the plane and is of trilateral or quadrilateral shape, the sides of which are straight and/or curved.

5. The device according to claim 1 where the functions θ(s) in each of said zones are arc tangent functions described by:

$$\theta(s); s_{st} \leq s \leq s_e \quad (1)$$

$$\theta - \theta_0 = B \tan^{-1}[k(s - s_0)] \quad (2)$$

where:
$s_{st}$ is the start of the range of the values in the dimension s for the whole of said zones and microstructures,
$s_e$ is the end of the range of the values in the dimension s for the whole of the said zones and microstructures,
and $\theta_0$ and $s_0$ are the respective median values of θ and of s in the said range,
and wherein the azimuthal planar angle θ as a function of s of the microstructures constituted in subset arrangement, associated with each of the zones respectively, is different for each zone, and defined by different variables B and k such that:

$$B = \frac{2(\theta_c - \theta_0)}{\pi} \quad (3)$$

and $$k = \frac{1}{(s_{st} - s_0)} \tan\left[\frac{\theta_{st} - \theta_0}{B}\right] \quad (4)$$

where $\alpha_c$ is an asymptotic value of θ when s→∞ or s→−∞.

6. The device according to claim 5, in which the dependence of θ on s is described by a portion of said arc tangent function.

7. The device according to claim 1, in which said subsets of microstructures are arranged so as to display n transitory images, n being a whole number greater than 1, said transitory images each being respectively visible at different observation angles.

8. The device according to claim 7, in which the n transitory images represent a motto being able to cover the form of at least one alphanumeric character, of at least one representation such as a portrait or a flower or any other representation, of at least one motif or of at least one symbol or a mixture of these.

9. The device according to claim 8, in which the n transitory images are each respectively visible at different observation angles and in which the form of the microstructures is characterized by at least n faces having different azimuthal angles θ different from one another, the number n being a whole number greater than 1.

10. The device according to claim 1, in which the microstructures and/or said subsets are arranged so as to display the image or the images in a dynamic manner under different viewing angles of the device.

11. The device according to claim 1, in which at least one side of the faces of said microstructure presents a length greater than 30 μm, preferably of at least 60 μm.

12. The device according to claim 1, in which said microstructures or the subsets are covered entirely or partially by at least one metallic layer or a layer having a refractive index different from that composing the said microstructures or any other layer modifying the optical properties of the microstructure.

13. The device according to claim 1, in which the microstructures are formed on a tool such as a flat or curved cliché, a lamination plate, a nickel matrix being able to envelope a printing cylinder, a forming mould insert or the mould itself, including the negative of the device.

14. The device according to claim 1, in which the microstructures are formed on a support, a polymer film.

15. The device according to claim 1, in which the microstructures are present on at least one layer of a stack of polymer films, of paper or a mixture of the two.

16. The device according to claim 1, in which the microstructures are printed, etched, embossed, or moulded on at least one of the faces of a support substrate so as to form a three-dimensional structure.

17. The device according to claim 14, in which the microstructures are formed above a layer having substantially uniform optical properties, said layer being able to be arranged on the reverse of the surface carrying the said microstructures or on any one of the other layers in a stack of polymer films and said microstructures being formed at least partially above the said layer.

18. A security document such as a bank note, an official document, an identity document, a packaging including a device according to claim 1.

* * * * *